United States Patent [19]
Singh et al.

[11] Patent Number: 6,057,035
[45] Date of Patent: May 2, 2000

[54] HIGH-TEMPERATURE POLYMER/ INORGANIC NANOCOMPOSITES

[75] Inventors: Anant Singh, Burlington; Ross Haghighat, Chelmsford, both of Mass.

[73] Assignee: Triton Systems, Inc., Chelmsford, Mass.

[21] Appl. No.: 09/090,864

[22] Filed: Jun. 5, 1998

Related U.S. Application Data

[60] Provisional application No. 60/048,921, Jun. 6, 1997.

[51] Int. Cl.[7] ........................................................ B32B 5/16
[52] U.S. Cl. ........................ 428/403; 428/404; 428/407; 428/446; 428/475.5; 428/473.5; 428/500
[58] Field of Search .................................... 428/403, 404, 428/407, 446, 475.5, 473.5, 500; 423/326

[56] References Cited

U.S. PATENT DOCUMENTS

| | | | |
|---|---|---|---|
| 4,310,471 | 1/1982 | Oswald et al. | 260/456 |
| 5,032,546 | 7/1991 | Giannaelis et al. | 501/3 |
| 5,385,776 | 1/1995 | Maxfield et al. | 428/297 |
| 5,514,734 | 5/1996 | Maxfield et al. | . |
| 5,527,871 | 6/1996 | Tani et al. | 528/10 |
| 5,552,469 | 9/1996 | Beall et al. | . |
| 5,554,670 | 9/1996 | Giannelis et al. | . |
| 5,716,709 | 2/1998 | Ferguson et al. | 428/420 |
| 5,726,113 | 3/1998 | Pinnavaia et al. | 502/62 |
| 5,747,560 | 5/1998 | Christiani et al. | 523/209 |
| 5,760,106 | 6/1998 | Pinnavaia et al. | 523/209 |
| 5,853,886 | 12/1998 | Pinnavaia et al. | 428/403 |
| 5,883,173 | 3/1999 | Elspass et al. | 524/446 |

OTHER PUBLICATIONS

Giannelis, E.P., "Polymer Layered Silicate Nanocomposites", Advanced Materials, 1996, pp. 29–35, vol. 8, No. 1, VCH Weinheim, Germany.

Krishnamoorti et al., "Structure and Dynamics of Polymer–Layered Silicate Nanocomposites", Chemical Materials, 1996, pp. 1728–1734, vol. 8, No. 8, American Chemical Society.

Muzny, C.D. et al., "Clay Platelet Dispersion in a Polymer Matrix", Materials Letters, Oct. 1996, pp. 379–384, vol. 28, Elsevier Science BV.

Hengzhen S. et al., "Interfacial Effects on the Reinforcement Properties of Polymer—Organoclay Nanocomposites", 1996, Chemical Materials, vol. 8, pp. 1584–1587, American Chemical Society.

Vaia, R.A. et al., "Microstructural Evolution of Melt Intercalated Polymer—Organically Modified Layered Silicates Nanocomposites", 1996, Chemical Materials vol. 8, pp. 2628–2635, American Chem. Soc.

Lan, T. et al., "Clay–Reinforced Epoxy Nanocomposites", 1994 Chemical Materials, vol. 6, pp. 2216–2219, American Chemical Society.

(List continued on next page.)

Primary Examiner—William Krynski
Assistant Examiner—B. Shewareged
Attorney, Agent, or Firm—James Creighton Wray; Meera P. Narasimhan

[57] ABSTRACT

The invention provides new high-use temperature, light-weight polymer/inorganic nanocomposite materials with enhanced thermal stability and performance characteristics. The invention provides two techniques that enhance the thermal stability of the nanocomposite systems from their current limits of 100–150° C. to over 250° C. The two unique approaches are based on innovative chemical design of the organic-inorganic interface using (i) more thermally stable surfactants/compatibility agents, and (ii) more thermally stable synthetic organically-modified layered-silicate reinforcements to create unique nanocomposites. These approaches offer processibility through both solution techniques, as well as solvent-free direct melt intercalation technique. The use of synthetic organically-modified layered silicates (having built-in surfactants) eliminates the poisonous alkyl ammonium surfactants that limit the applications of nanocomposites as food packaging materials. The new technology provides hitherto unobtainable thermal stability and performance characteristics, and has numerous applications in automotive, aerospace, electronic and food and beverage industries.

25 Claims, 2 Drawing Sheets

OTHER PUBLICATIONS

Vaia, R.A. et al., "Synthesis and Properties of Two–Dimensional Nanostructures by Direct Intercalation of Polymer Melts in Layered Silicates", 1993, Chemical Materials, vol. 5, pp. 1694–1696, American Chemical Society.

Burnside, S.D. et al., "Synthesis and Properties of New Poly (Dimethylsiloxane) Nanocomposites", Sep. 1995, Chemical Materials, vol. 7, No. 9, pp. 1597–1600.

Kojima, Y. et al., "Synthesis of Nylon 6–Clay Hybrid by Montmorillonite Intercalated with e–Caprolactam", 1993, Journal of Polymer Science, Part A, vol. 31, pp. 983–986, John Wiley & Sons, NY.

Messersmith, Phillip B., et al., "Synthesis and Barrier Properties of Poly (e–Caprolactone) Layered Silicate Nanocomposites", 1995, Journal of Polymer Science, Part A, vol. 33, pp. 1047–1057, John Wiley & Sons, New York.

Ukrainczyk, L. et al., "Template Synthesis and Characterization of Layered Al– and Mg– Silsesquioxanes", 1997, Journal of Physical Chemistry, B, vol. 101, No. 4, pp. 531–539, American Chemical Society.

Current state-of-the art

Temp. Limit = 100 - 150°C

SILICATE LAYER

Approach

Temp. Limit = 200°C

SILICATE LAYER

Approach

Temp. Limit > 250°C

SILICATE LAYER

| Property | Nanocomposite | Neat Nylon-6 |
|---|---|---|
| Tensile Modulus (GPa) | 2.1 | 1.1 |
| Tensile Strength (MPa) | 107 | 69 |
| Heat Distortion Temperature(°C) | 145 | 65 |
| Impact Strength (kJ/m2) | 2.8 | 2.3 |
| Water Adsorption (%) | 0.51 | 0.87 |
| Coefficient of Thermal Expansion (x, y) | 6.3 x 10-5 | 13 x 10-5 |

HIGH-TEMPERATURE POLYMER/ INORGANIC NANOCOMPOSITES

BACKGROUND OF THE INVENTION

This application claims the benefit of U.S. Provisional Application No. 60/048,921, filed Jun. 6, 1997.

A nanocomposite is defined as an interacting mixture of two phases, one of which is in the nanometer size range in at least one dimension. Due to the nanoscale dimensions of the reinforcement phase, nanocomposites display unique and improved properties compared to that of micro- or macro-composites. A wealth of unique properties and technological opportunities are offered by these materials. Hence, over the last few years, nanocomposite materials have become an integral part of the synthesis of new materials for a wide variety of applications including mechanical, optical, magnetic and dielectric applications.

Polymer/inorganic nanocomposites have attracted much attention as the properties of polymers are further enhanced beyond what is achievable from more conventional particulate-filled or micro-composites. Specifically, layered mica-type-silicates have been widely used as inorganic reinforcements for polymer matrices to create polymer nanocomposites with nanoscale dispersion of the inorganic phase within the polymer matrix. Layered silicate-polymer nanocomposites having (i) polymer chains intercalated between the silicate layers or (ii) individual silicate layers delaminated and dispersed in a continuous polymer matrix, have been fabricated.

Surface modification in the existing nanocomposites is often achieved by using an organic surfactant such as alkyl ammonium. The organic cation exchange at the oxide surface provides favorable sites for interaction between the organic and inorganic functionalities. That approach has been exploited and has been shown to offer significant performance advantages for a variety of commodity polymers. However, the thermal instability of the surfactants used has hindered that technology from realizing its full potential.

Significant new applications in automotive, aerospace, electronic and food packaging industries will be realized by fabricating nanocomposites having superior interfacial design and enhanced thermal stability.

SUMMARY OF THE INVENTION

The invention provides new high-use temperature, light-weight polymer/inorganic nanocomposite materials with enhanced thermal stability and performance characteristics. The invention provides two techniques that enhance the thermal stability of the nanocomposite systems from their current limits of 100–150° C. to over 250° C. The two unique approaches are based on innovative chemical design of the organic-inorganic interface using (i) more thermally stable surfactants/compatibility agents, and (ii) more thermally stable synthetic organically-modified layered-silicate reinforcements to create unique nanocomposites. These approaches offer processibility through both solution techniques, as well as solvent-free direct melt intercalation technique.

The use of synthetic organically-modified layered silicates (having built-in surfactants) eliminates the poisonous alkyl ammonium surfactants which limit the applications of nanocomposites as food packaging materials. Recyclable and more cost-effective food packaging materials are provided to replace unrecyclable multilayer plastic packages.

The properties of these nanocomposites are optimized in order to manufacture these materials in commercially applicable forms, e.g. films, fibers and molded components. The new technology provides hitherto unobtainable thermal stability and performance characteristics, and has numerous applications in automotive, aerospace, electronic and food and beverage industries.

These and further and other objects and features of the invention are apparent in the disclosure, which includes the above and ongoing written specification, with the claims and the drawings.

DETAILED DESCRIPTION OF THE PREFERRED EMBODIMENTS

Figure 1A:
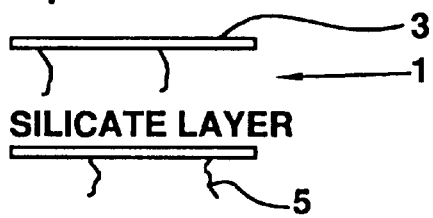
FIG. 1 shows high temperature, high performance organic/inorganic nanocomposites.
Figure 1B:
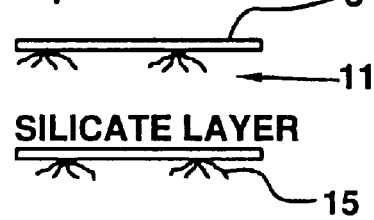
Figure 2:
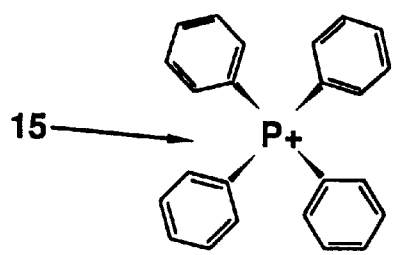
FIG. 2 shows a chemical structure of the preferred tetraphenyl phosphonium surfactant.

Referring to FIG. 1A, the current state-of-the-art is schematically shown. Nanocomposites 1 have silicate layers 3 with alkyl ammonium surfactants 5 on the surface. The first part of the invention, schematically shown in FIG. 1B, provides new organic/inorganic nanocomposite structures 11 by substituting high temperature organic phosphonium cations 15 for the standard compatibilizing agent, viz., alkyl ammonium cations. In the new invention, ion exchange occurs with the more thermally stable organic phosphonium cations, e.g. tetraphenyl phosphonium 15 (FIG. 2). That modification enhances the thermal stability of the nanocomposites from the current level of about 100–150° C. to approximately 175–200° C. or more without affecting other physical or mechanical properties of the resulting nanocomposites.

The inventors have synthesized a new class of phenyl phosphine-based arylene ether structural polymers that offer excellent mechanical and thermo-oxidative properties. Those polymers are somewhat similar in nature to phenyl phosphonium, are qualified for space missions by NASA and are being commercially produced.

Figure 1C:
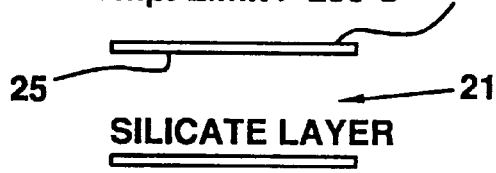

As schematically shown in FIG. 1C, the invention also provides the innovative use of organically modified layered aluminosilicates 23 (ORMLAS) that combine the layered silicates and the organic compatibilizing agent 25 in a single chemical compound 21, rendering the material thermally stable, and highly organophilic. This dual function compound is then miscible with a host of structural matrix resins such as polyamides (nylon $T_m$ 120° C.), polyether imide (Ultem® $T_g$ 215° C.), polyimides ($T_g$>275° C.) and poly arylene ethers ($T_g$>225–350° C). These approaches offer processibility through both, solution techniques, as well as solvent-free direct melt intercalation technique. Moreover, since the bonding of the organic group to the inorganic Si atom is through the Si—C bonds, the ORMLAS exhibits excellent thermal stability. Fabricating ORMLAS layered silicates with high temperature structural polymers offers an attractive combination of properties such as high heat distortion temperature, excellent impact resistance and excellent mechanical properties.

The invention provides high use-temperature light-weight polymer/inorganic nanocomposites which have outstanding properties, compared to the state of the art layered silicate nanocomposites that use alkyl ammonium as the surfactant. A database of properties of control specimens is established for nanocomposites made from mixtures of a number of commodity polymers (e.g., Polystyrene, Nylon, modified Polyetherimide, Polyethylene oxide) with montmorillonite containing alkyl ammonium-surfactants (through cation-exchange).

Superior polymer/layered silicate nanocomposites are fabricated by using mixtures of polyetherimide (PEI) resins with montmorillonite containing organic phosphonium surfactants, e.g., tetraphenyl phosphonium (TPP) (through cation-exchange), via direct polymer melt intercalation process.

Superior nanocomposites are fabricated by direct polymer melt intercalating organically-modified layered aluminosilicates (ORMLAS) with polyetherimide and thermoplastic polyimide (PI) or polyarylene ether (PAE) resins. The direct bonding of the organic surfactant group to the structural Si atom through an Si—C bond provides a "built-in" surfactant with enhanced thermal stability, and also allows for easy tailoring of the organic-inorganic interface through the organic groups.

Interfacial, thermal, mechanical and physical properties of the fabricated nanocomposites are evaluated to optimize the most promising nanocomposites.

These nanocomposites are designed by creating favorable interactions at the polymer-layered silicate interfaces. That is achieved by making the chemistry of the inorganic reinforcement phase more compatible with the organic polymer matrix, i. e., by making the layered silicate surfaces organophilic. The normally hydrophilic silicate surfaces are rendered organophilic after ion-exchange reactions of the loosely-held cations in the interlayer spaces of the silicate structure with organic cations.

Polymer-layered silicate nanocomposites have been synthesized for a variety of commodity polymer systems. Nanocomposites with properties much superior to that of the corresponding unfilled and conventionally-filled polymers are hence obtained. This unique combination of improved properties, easy fabricability, and low-cost, offers tremendous potential for commercial applications of these materials.

Figures 3, 4:
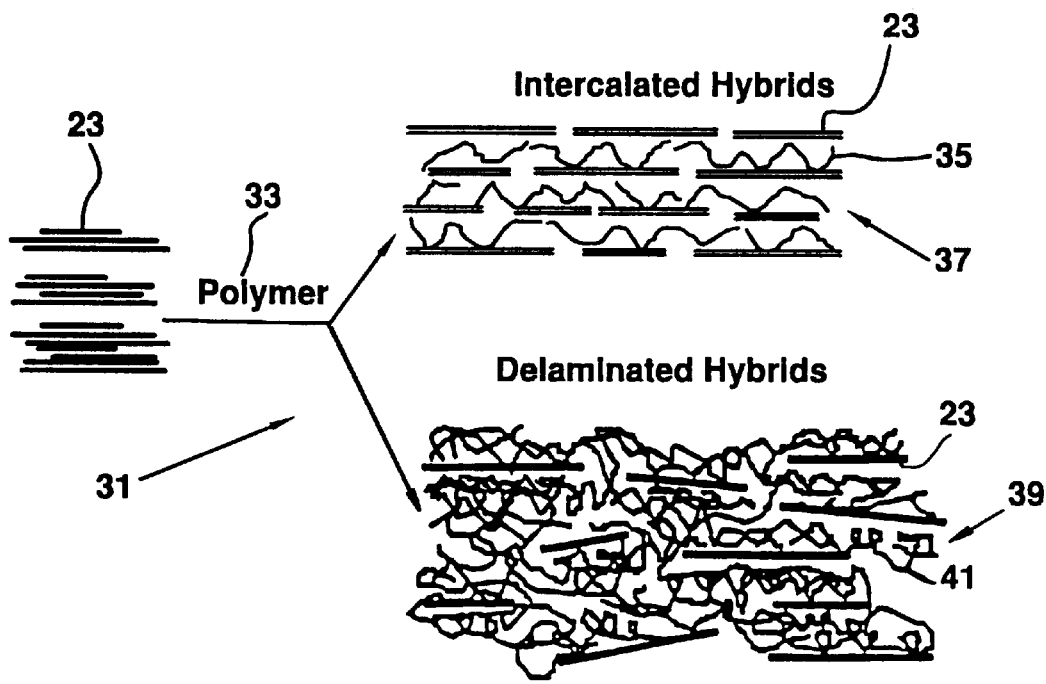
FIG. 3 shows a schematic of polymer-layered silicate nanocomposite structures.
FIG. 4 provides a table of the properties of nylon-6 and layered silicate-nylon nanocomposites.

The synthetic creation of polymer/inorganic nanocomposites 31, schematically shown in FIG. 3, exploits the ability of the layered inorganic silicates 23 to accommodate polymer 33 chains 35 between the layers 23 creating intercalated hybrids 37. Delaminated hybrids 39 are created by dispersing individual layers 23 in a continuous polymer matrix 41. FIG. 3 shows a schematic representation 31 of the polymer/inorganic nanocomposite structures 37, 39 obtained using the layered silicates 23. Nanocomposites 37 have single polymer chains intercalated between the silicate layers 23. In nanocomposites 39 the host silicate layers 23 are delaminated and dispersed in a continuous polymer matrix 41.

That synthetic design also exploits the ion-exchange capacity of these layered-silicates 23 which allows for a fine-tuning of their surface chemistry to create a favorable organic-inorganic interface.

The advantages of the layered silicates in the synthesis of those nanocomposites arise from their unique crystal structure. Those layered silicate materials are fine-grained and have crystal structures with a "platy" habit. Their structure is common to the family of 2:1 layered- or phyllosilicates, well-known examples of which are mica and talc. The structure is composed of $SiO_4$ tetrahedra fused to edge-shared octahedra of aluminum or magnesium hydroxides. Layer stacking leads to regular Van der Waals gaps between the layers, viz., interlayer or gallery. Isomorphic substitution of cations is common (for example, $Al3+$ or $Fe3+$ substituting for $Si4+$ in the tetrahedral network). That leads to a net negative charge on the structure, which is generally counter-balanced by cations residing in the interlayer spacing. Those cations are more or less readily exchanged and result in the cation-exchange capacity of the materials.

Those interlayer cations are, for example, $Na+$ or $K+$ in pristine layered silicates. For the synthesis of the polymer/inorganic nanocomposites, an organophilic surface chemistry is desired to create favorable interactions with the organic polymer matrix. Therefore, those inorganic cations are exchanged with various organic cations, e. g., alkyl ammonium cations. The hydrophilic silicate surface is thus rendered organophilic. Those surfactants typically are alkyl ammonium compounds e.g., dimethyl ditallow ammonium bromide. One example is the use of dimethyl ditallow ammonium bromide to cation-exchange with the $Na+$-montmorillonite—a layered silicate. Such ion-exchanged 'organo'silicate clays are commercially available. Herein lies the opportunity to tailor the interfacial chemistry of those polymer/inorganic nanocomposites through creation of the organic functional groups. The properties of the nanocomposites can be optimized through interfacial surface chemical design.

The synthesis of layered silicate nanocomposites has involved intercalation of a suitable monomer followed by in situ polymerization. Alternatively, polymer intercalation is carried out from solution. Those techniques limit use in the case of most technologically important polymers, since suitable monomers and compatible polymer-silicate solvent systems are not always available. The spectrum of nanocomposite systems that can be synthesized is considerably broadened by the advent of a more versatile and environmentally-friendly synthetic approach, called direct polymer melt intercalation. In that approach, the polymer and the silicate are mixed, and the mixture is heated above the softening point of the polymer. That technique allows the synthesis of a much wider range of polymer/inorganic nanocomposites. Polymers with varying degrees of polarity and crystallinity are directly intercalated into organically-modified layered silicates. Example of polymers use direct polymer melt intercalation include polystyrene, poly (dimethylsiloxane), poly(vinylidene fluoride), poly (ϵ-caprolactone), and (polyethylene oxide).

Delamination of the silicate layers can also be achieved during nanocomposite synthesis through 'polymer melt intercalation'. An example is the delamination of the individual silicate layers achieved by suspending ditallow ammonium-exchanged montmorillonite in PDMS (Polydimethylsiloxane) at room temperature and sonicating for 2 minutes.

The advantages and some of the most attractive properties of these nanocomposites can be seen in the data in FIG. 4. Significant enhancements in properties of Nylon-6 are obtained as a result of forming a nanocomposite containing 4% by weight layered silicate in the Nylon-6 matrix.

The data in FIG. 4 show that the tensile strength and modulus are enhanced without any loss in impact strength. Loss of impact strength is usually witnessed with such enhancements in the case of conventional filled polymers. The significant increase in the heat distortion temperature (i. e., 145° C. up from 65° C.) extends the use-temperature of Nylon to under-the-hood structural components in automobiles. A reduction in water adsorption accompanies the improvements in mechanical properties.

Considerable increases in heat resistance and thermal stability are obtained with these nanocomposites. Polydimethylsiloxane—layered silicate nanocomposites have a delayed thermal decomposition compared to that of the pure polymer—which decomposes into volatile cyclic oligomers. The improved barrier properties of these nanocomposite materials are demonstrated through measurements of relative permeability of liquids and gases through the nanocomposites. Dramatic reductions in permeability are obtained at low inorganic contents compared to conventionally-filled polymers with much higher filler contents. The large aspect ratio of the silicate layers forces the solutes to follow more tortuous paths in the polymer matrix around the silicate layers. That results in much larger effective diffusion distances, and hence lower permeabilities. The enhanced thermal stability of the nanocomposites is also attributed to the hindered out-diffusion of the volatile decomposition products. Self-extinguishing characteristics in those materials are related to the barrier properties rendered by the silicate layers.

A key to obtaining superior properties at low inorganic loadings is the homogeneous nanoscale dispersion of the inorganic phase in the polymer, and the creation of favorable interactions at the organic-inorganic interface. Favorable interfacial chemistry leads to organic and inorganic phases being dispersed at a nanometer level. The superior properties of the new composites are obtained at low inorganic loadings. The use of low inorganic contents leads to significant advantages. High degrees of stiffness, strength and barrier properties are obtained with far less inorganic content than comparable glass- or mineral reinforced polymers. Considerable weight savings are, therefore, obtained.

Some commercial applications of these materials are, for example, Nylon-layered nanocomposite automatic timing belt cover. Other applications include airplane interiors, fuel tanks, components in electrical and electronic parts, under-the-hood automotive structural parts, brakes and tires. Applications of nanocomposite barrier films may be used in food packaging and in other applications are also possibilities.

The fact that the nanocomposites yield significant enhancements in properties at low inorganic loadings also provides ease-of-manufacturing and several cost-benefits. It allows for the use of simple manufacturing techniques (viz., extrusion, injection-molding and casting) which are normally used for pure polymers. Therefore, the nanocomposites can be manufactured at a much lower cost than the more conventional fiber- or mineral-reinforced composites which require more expensive fabrication procedures. That provides further reasons for their commercial appeal.

Commodity polymers provide use-temperatures below 125° C. Substructure applications for rockets and aircraft require higher long term use-temperatures of about 175° C. and 250° C.

The thermal stability of the current state-of-the-art nanocomposite systems is often limited by the thermal instability of the surfactants used to create favorable interactions at the interface. Those surfactants typically are alkyl ammonium compounds. One example is the use of dimethyl ditallow ammonium bromide to ion-exchange with the Na+-montmorillonite—a layered clay. The thermal stability of the nanocomposite system is, therefore, limited by the thermal stability of the alkyl ammonium compound. Degradation of those surfactant molecules, and hence that of the organic-inorganic interface, begins at temperatures around 100–110° C.

The invention provides more thermally stable surfactants, which optimize the dispersion of the inorganic phase, and also enhance the compatibility at the organic-inorganic interface through the creation of favorable interactions. The invention therefore provides enhanced use-temperatures of the nanocomposites. One part elevates the use-temperature of the nanocomposite system by using more thermally stable surfactants than the currently used alkyl ammonium compounds.

The first part provides tetra-phenyl phosphonium compounds (with thermal stability in the range of 190–200° C.) to carry out a cation-exchange with the layered silicate reinforcement. Tetraphenyl phosphonium is a reactive salt with a net positive charge, as shown in FIG. 2. The salt readily ion exchanges with the cations on the surface of the inorganic phase attaching itself from the oxide surface and thus rendering the surface organophilic. That surface modified system lends itself to direct melt intercalation. Because tetraphenyl phosphonium is a high temperature organic moiety with thermal stability in excess of 200° C., the first part of the invention provides nanocomposites which will satisfy the need for long-term use-temperatures of 175–200° C.

The second part of the invention extends the use-temperature of the nanocomposites to over 250° C. It is based on the innovative use of organically-modified layered alumino-silicates (ORMLAS) that combine the layered silicate and the organic surfactant/compatibility agent in a single chemical compound. The organic surfactant groups are bonded to the structural Si atom through thermally stable Si—C bonds. The thermal stability of the overall system is therefore greatly enhanced. Therefore, those materials provide unique inorganic layered silicate reinforcements having markedly more thermally-stable surfactants "built-in" to the chemical structure. Those materials are miscible in a host of structural matrix resins, such as polyamides (nylon Tm 120° C.) and polyether imide (Ultem $T_g$ 215° C.), polyimides ($T_g$>275° C.) and poly arylene ether (PAE $T_m$>325–350° C.).

Those ORMLAS materials are synthesized using the sol-gel process where the organic groups are incorporated into the molecular structure through the use of organically modified silicon alkoxides, i. e., precursors containing Si—CxHx bonds. The organic functionality is therefore directly bonded to the structural Si atom by the Si—C bond. The organically modified aluminosilicate will be synthesized using mixtures of organically-modified silicon alkoxides and solutions of aluminum chloride. The standard approach combines an alcohol solution of aluminum chloride with an alcohol solution of organically functionalized alkoxysilane. The organically functionalized trialkoxysilane, e. g., alkyltriethoxysilane, provides alkyl organic groups connected directly through Si—C bonds. The mixture is then condensed (crosslinked) to form a gel at appropriate pH conditions by the addition of NaOH. The gel is aged, filtered, washed with distilled water, and then dried in vacuum. That procedure yields a stable layered organophilic compound. The resulting material is either precipitated as a powder, dried and ground to appropriate particle size, or cast into various shapes and forms. In that case, the ORMLAS is precipitated as a powder or ground and classified it into appropriate size particles for incorporation with the polymer matrix for direct melt intercalation. A unique feature of those ORMLAS compounds is that they are especially engineered to delaminate in the presence of a variety of polymer resins—thus promoting the dispersion of the inorganic layers in the polymer matrix. That versatile and innovative new feature yield nanocomposites which will satisfy needs for a range of use-temperatures extending to long-term use-temperatures over 250° C.

In addition to the enhanced thermal stability, the use of synthetic organically-modified layered silicates (ORMLAS) having built-in surfactants eliminates the poisonous alkyl ammonium surfactants which limit the applications of nanocomposites as food packaging materials. The elimination of the ion-exchange also lowers the processing costs. Therefore, that technique yields recyclable and more cost-effective food packaging materials with superior gas-barrier properties to replace unrecyclable multilayer plastic food packaging materials.

While the invention has been described with reference to specific embodiments, modifications and variations of the invention may be constructed without departing from the scope of the invention, which is defined in the following claims.

We claim:

1. Synthesized materials comprising organic-inorganic nanocomposites having alternating organic layers and inorganic layers with intermediate organic phosphonium surfactants, wherein the inorganic layers are silicate and the organic surfactant is tetraphenyl phosphonium.

2. The synthesized materials of claim 1, wherein the organic layers are nylon.

3. Synthesized materials comprising organic-inorganic nanocomposites having alternating organic layers and inorganic layers with intermediate organic surfactant, with a phosphonium compatibility agent within organophilic layered silicate as the inorganic layers, wherein the organic layers are nylon and the organic surfactant is tetraphenyl phosphonium.

4. Thermally stable nanocomposites comprising alternating organic layers and inorganic layers and intermediate thermally stable phosphonium compatibility agents, wherein the intermediate thermally stable compatibility agents comprise tetraphenyl phosphonium surfactants.

5. Thermally stable nanocomposites comprising alternating organic layers and inorganic layers and intermediate thermally stable phosphonium compatibility agents, wherein the nanocomposites comprise gas barriers.

6. The nanocomposites of claim 4, wherein the nanocomposites comprise flame retardant structures.

7. Thermally stable nanocomposites comprising alternating organic layers and inorganic layers and intermediate thermally stable phosphonium compatibility agents, wherein the nanocomposites are selected from the group consisting of films, fibers, insulator sleeves, extruded and molded components.

8. Thermally stable nanocomposites comprising alternating organic layers and inorganic layers and thermally stable synthetic alkyl group organically modified layered-silicate reinforcements as the inorganic layers.

9. The nanocomposites of claim 8, wherein the layered silicates have built-in alkyl triethoxysilane surfactants.

10. Nanocomposites comprising alternating organic layers and inorganic layers and compatibility agents having organic phosphonium cations binding the organic layers and the inorganic layers, wherein the organic phosphonium cations are phenyl phosphine-based.

11. Nanocomposites comprising alternating organic layers and inorganic layers and compatibility agents having organic phosphonium cations binding the organic layers and the inorganic layers, wherein the organic phosphonium cations are arylene ether structural polymers.

12. Nanocomposites comprising alternating organic layers and inorganic layers and alkyl group compatibility agents wherein the inorganic layers and compatibility agents are combined.

13. The nanocomposites of claim 12, wherein the inorganic layers and compatibility agents are in a thermally stable, organophilic chemical compound mixed with the organic layers that comprise structural matrix resin.

14. The nanocomposites of claim 13, wherein the structural matrix resin is selected from a group comprising polyamide, polyether imide, polyimide, and polyarylene ethers.

15. The nanocomposites of claim 14, wherein the nanocomposites are high use-temperature, light weight polymer-inorganic nanocomposites.

16. The nanocomposites of claim 13, wherein the structural matrix resin is a mixture of polystyrene, nylon, modified polyether imide and polyethylene oxide.

17. Layered silicate nanocomposites, comprising high use temperature, lightweight polymer-inorganic nanocomposites having layered silicates and organic compatibilizing agents as a single chemical compound mixed and dispersed in structural matrix resin.

18. The nanocomposites of claim 17, wherein the organic compatibilizing agent has high temperature organic phosphonium cations.

19. The nanocomposites of claim 18, wherein the organic phosphonium is tetraphenyl phosphonium.

20. The nanocomposites of claim 18, wherein the organic phosphonium is a montmorillonite containing organic phosphonium.

21. The nanocomposites of claim 17, wherein the structural matrix resin is selected from the group consisting of polyamides, polyether imide, polyimides and polyarylene ethers.

22. The nanocomposites of claim 21, wherein the nanocomposite selected matrix resin is mixed with tetraphenyl phosphonium as the compatibilizing agent.

23. The nanocomposites of claim 10, wherein the organic phosphonium cations contain aliphatic and polymerizable organic groups.

24. The nanocomposite of claim 10, wherein the organic phosphonium cations contain aliphatic groups.

25. The nanocomposite of claim 10, wherein the organic phosphonium cations contain polymerizable organic groups.

* * * * *